United States Patent
Magnusson et al.

(10) Patent No.: US 8,699,654 B2
(45) Date of Patent: Apr. 15, 2014

(54) METHOD COMPRISING MEASUREMENT ON FUEL CHANNELS OF FUEL ASSEMBLIES FOR NUCLEAR BOILING WATER REACTORS

(75) Inventors: Kurt-Åke Magnusson, Skultuna (SE); Holger Wiese, Schönenwerd (CH); Björn Andersson, Västerås (SE); Göran Jergeus, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 634 days.

(21) Appl. No.: 12/996,947
(22) PCT Filed: Jun. 8, 2009
(86) PCT No.: PCT/SE2009/050686
§ 371 (c)(1), (2), (4) Date: Mar. 18, 2011
(87) PCT Pub. No.: WO2009/151384
PCT Pub. Date: Dec. 17, 2009

(65) Prior Publication Data
US 2011/0164716 A1      Jul. 7, 2011

(30) Foreign Application Priority Data
Jun. 9, 2008  (SE) ..................... 0801344

(51) Int. Cl.
*G21C 17/06*       (2006.01)
*G01N 27/72*      (2006.01)
*G01N 27/90*      (2006.01)
*G21C 17/00*      (2006.01)
*G01N 27/00*      (2006.01)

(52) U.S. Cl.
USPC ........... 376/259; 376/245; 376/409; 376/426; 376/434; 324/200; 324/222

(58) Field of Classification Search
CPC ......... Y02E 30/00; Y02E 30/30; Y02E 30/38; Y02E 30/40; G21C 3/00; G21C 3/02; G21C 3/04; G21C 3/30; G21C 17/00; G21C 17/06; G21C 17/063; G21C 17/066; G21C 17/07; G21C 17/10; G21C 17/102; G01N 27/00; G01N 27/72; G01N 27/82; G01N 27/90; G01N 27/9006
USPC ......... 376/245, 246, 249, 257–259, 277, 409, 376/426, 434; 324/200, 222
See application file for complete search history.

(56) References Cited

U.S. PATENT DOCUMENTS
4,047,103 A * 9/1977 Day et al. ..................... 376/245
4,352,065 A * 9/1982 Rogachev et al. ........... 376/245
(Continued)

FOREIGN PATENT DOCUMENTS
EP      1227296 A1    7/2002
JP      58 048802     3/1983
(Continued)

OTHER PUBLICATIONS

United States Nuclear Regulatory Comission, Office of Nuclear Reactor Regulation, NRC Information Notice 89-69, Supplement 1: Shadow Corrosion Resulting in Fuel Channel Bowing, ML032380003, Aug. 25, 2003.
(Continued)

*Primary Examiner* — Bernarr Gregory
(74) *Attorney, Agent, or Firm* — Moore & Van Allen PLLC (57) ABSTRACT

The invention concerns a method comprising measurement on a fuel channel (14) of fuel assemblies (8) for nuclear boiling water reactors. The method comprises that:
  the measurement is done by the use of a non-destructive inductive eddy current measurement method,
  the measurement is done on a fuel channel (14) which has been used at least a certain time during operation in the core of a nuclear boiling water reactor,
  the measurement is done when the fuel channel (14) is located in water,
  the measurement is done on different places on the fuel channel (14),
  wherein through the method at least the hydride content of the fuel channel (14) at said places is determined. The method can be used in order to find out how shadow corrosion from a neighboring control rod influences the properties of the fuel channel (14).

15 Claims, 2 Drawing Sheets

(56) References Cited

U.S. PATENT DOCUMENTS

| | | | | |
|---|---|---|---|---|
| 4,633,177 | A | * | 12/1986 | David et al. .................... 376/249 |
| 4,657,728 | A | * | 4/1987 | Coppa et al. ................... 376/249 |
| 4,728,483 | A | * | 3/1988 | Ahmed et al. ................. 376/258 |
| 4,741,878 | A | * | 5/1988 | Gebelin et al. ................ 376/245 |
| 4,766,374 | A | * | 8/1988 | Glass et al. .................... 376/249 |
| 4,851,773 | A | * | 7/1989 | Rothstein ....................... 376/249 |
| 4,876,506 | A | | 10/1989 | Brown et al. |
| 4,889,679 | A | * | 12/1989 | Snyder et al. .................. 376/258 |
| 5,124,641 | A | | 6/1992 | Netter et al. ................... 376/245 |
| 5,418,823 | A | * | 5/1995 | Kervinen et al. ............. 376/245 |
| 5,889,401 | A | | 3/1999 | Jourdain et al. |
| 6,128,361 | A | | 10/2000 | Terhune et al. |
| 6,541,964 | B1 | | 4/2003 | Jourdain et al. |
| 8,116,422 | B2 | * | 2/2012 | Lutz et al. ...................... 376/277 |
| 2006/0291608 | A1 | | 12/2006 | Davis et al. |
| 2007/0153963 | A1 | | 7/2007 | Lutz et al. |
| 2007/0279050 | A1 | | 12/2007 | Edsinger et al. |

FOREIGN PATENT DOCUMENTS

| | | |
|---|---|---|
| JP | 60 219540 | 11/1985 |
| JP | 61-086601 | 5/1986 |
| JP | 62 228985 | 7/1987 |
| JP | 63 151810 | 6/1988 |
| JP | 10-10263 | 1/1998 |
| JP | 2002-532683 | 10/2002 |
| JP | 2007-147397 | 6/2007 |
| JP | 2008-70138 | 3/2008 |
| WO | 00/34768 A1 | 6/2000 |
| WO | 2007/053100 A1 | 5/2007 |

OTHER PUBLICATIONS

The International Bureau of WIPO, PCT International Preliminary Report on Patentability for PCT/SE2009/050686 dated Dec. 13, 2010.

* cited by examiner

METHOD COMPRISING MEASUREMENT ON FUEL CHANNELS OF FUEL ASSEMBLIES FOR NUCLEAR BOILING WATER REACTORS

CROSS-REFERENCE TO RELATED APPLICATIONS

This application is filed under the provisions of 35 U.S.C. §and claims the benefit of priority of International Patent Application No. PCT/SE2009/050686, filed on 8 Jun. 2009 entitled "Method Comprising Measurement of Fuel Channels of Fuel Assemblies for Nuclear Boiling Water Reactors"in the name of Kurt-Ake Magnusson, et al., which claims priority of Swedish Patent Application No. SE 0801344-3, filed on 9 Jun. 2008, both of which are hereby incorporated by reference herein in its entirety.

BACKGROUND OF THE INVENTION AND PRIOR ART

The invention concerns a method comprising measurement of at least one property of at least one fuel channel of fuel assemblies for nuclear boiling water reactors.

Figure 1:
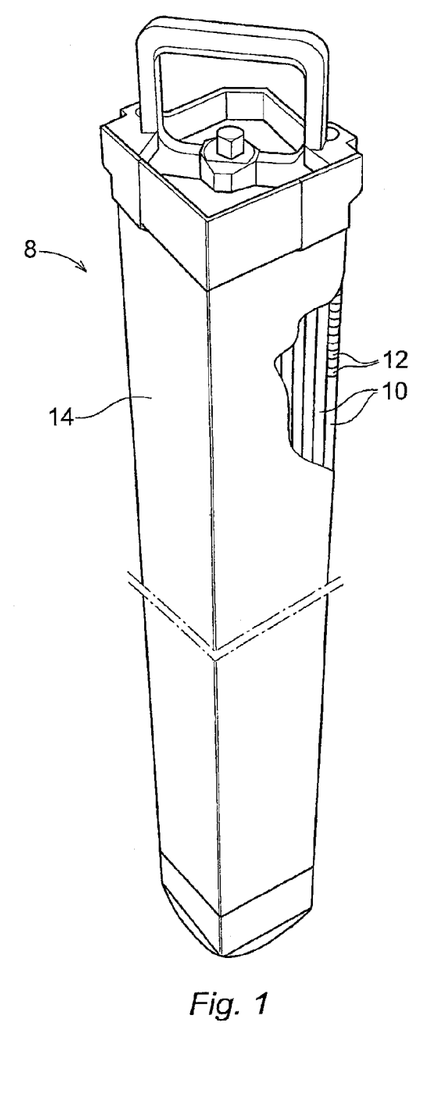
FIG. 1 shows schematically a fuel assembly for a nuclear boiling water reactor.

The core of a nuclear boiling water reactor (BWR) comprises a large number of fuel assemblies. The fuel assemblies extend in the vertical direction and are arranged parallel to each other in the core. FIG. 1 shows schematically an example of such a fuel assembly 8. The fuel assembly 8 comprises a number of fuel rods 10.

The bundle of fuel rods 10 which is in the fuel assembly 8 is at the sides surrounded by a casing 14. The casing is sometimes also called box or box wall. In the present application the casing is however called fuel channel 14. The fuel channel 14 surrounds the fuel bundle on all sides (except for upwards and downwards). Usually, the fuel assembly 8 is quadrilateral and the fuel channel 14 thus has a rectangular or square cross section shape. For the sake of clarity, in FIG. 1 the fuel channel 14 is partly removed on one side in order to show the fuel rods 10 that exist in the fuel assembly 8.

The fuel rods 8 consist of cladding tubes which contain nuclear fuel material, often in the form of pellets. In FIG. 1, a part of such a cladding tube is removed in order to show the nuclear fuel material 12. The fuel rods 10 are normally arranged parallel to each other in the fuel assembly 8. The actual nuclear fuel material 12 does not reach all the way up to the top of the fuel assembly 8 and also not always all the way down to the bottom of the fuel assembly 8. The length of the active part of the fuel assembly 8 is therefore shorter than the whole fuel assembly 8.

Figure 2:
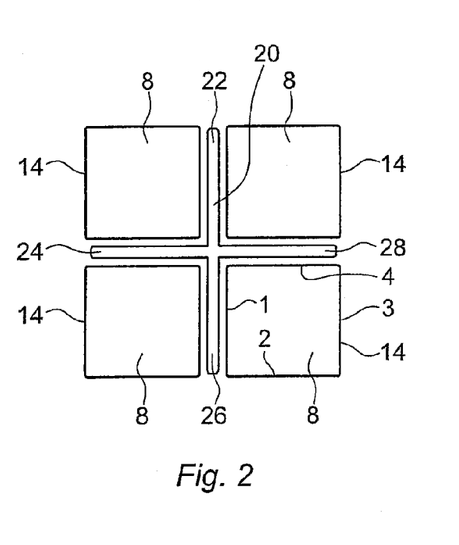
FIG. 2 shows schematically a cross-section of a part of the core in a nuclear boiling water reactor with four fuel assemblies and an inserted control rod.

FIG. 2 shows schematically a cross-sectional view of four fuel assemblies 8. For the sake of clarity, in FIG. 2 only the quadrilateral fuel channels 14 of the fuel assembly 8 are shown. Each fuel channel 14 thus has four sidewalls. These have in one of the fuel assemblies 8 in FIG. 2 been numbered as 1, 2, 3 and 4.

As has been mentioned above, there is in the core of the nuclear reactor a large number of fuel assemblies 8 of the kind described above. Between certain of these fuel assemblies 8 there are, at least during a part of the time when the reactor is in operation, inserted control rods. Such a control rod 20 is shown very schematically in cross-section in FIG. 2. The control rod 20 has four control rod blades 22, 24, 26, 28 which contain a neutron absorbing material. The fuel channels 14 are usually made of a zirconium-based alloy. The control rod 20 is normally made of another alloy, often of stainless steel.

In the very particular environment which exists in the core of a nuclear reactor the components therein are influenced in different manners. Among other things, there is a tendency to the formation of hydrides in the fuel channels 14. Such hydride formation takes primarily place on the levels of the fuel channel 14 which correspond to the active area (where there is nuclear fuel) in the fuel assembly 8. Furthermore, oxides are formed on the fuel channels 14.

A particular phenomenon which is known within the field is so-called shadow corrosion. Shadow corrosion occurs in this particular environment, in particular on components of zirconium-based alloys when these components are arranged at a short distance from components of other materials, for example components of stainless steel. Shadow corrosion occurs in particular at a level where there is nuclear fuel in the fuel assembly, and where therefore a strong radiation is the case. Shadow corrosion can be seen as a dark area on the component which has been the subject of shadow corrosion. It is thus known that shadow corrosion may occur on the sidewalls 1, 4 of the fuel channels 14 which face a neighbouring control rod 20.

Shadow corrosion may cause different problems. Among other things, it has appeared that shadow corrosion may lead to the fact that the fuel channel 14 (and thereby the fuel assembly 8) will get bent. It is believed that this is due to the fact that shadow corrosion may lead to an increased hydrogen absorption, i.e. increased hydration, which in its turn may lead to hydrogen induced growth of the sidewalls 1, 4 of the fuel channel 14 which are the subject of shadow corrosion. This phenomenon is described in for example NRC Information Notice 89-69, Supplement 1: Shadow corrosion resulting in fuel channel bowing, United States Nuclear Regulatory Commission Office of Nuclear Reactor Regulation Washington, D.C. 20555-0001, 25 Aug. 2003.

The bow of the fuel assembly 8 may in its turn lead to further problems. For example, the bow may thereby be such that friction arises between the control rod 20 and neighbouring fuel assemblies 8. This may lead to the fact that it is not possible to withdraw the control rod 20 from the space between the fuel assemblies 8. Furthermore, the bow of the fuel assemblies 8 may lead to restrictions concerning allowed critical power (Critical Power Ration; CPR), which in its turn leads to the fact that the reactor cannot be operated with as high power as otherwise. This constitutes a high cost for the one which operates the nuclear power plant.

A further problem which has been noted is that even if the fuel assembly 8 in question only has been the subject of shadow corrosion from a control rod 20 during a part of its operation time, the shadow corrosion and the therewith associated increased hydrogen induced growth of the fuel channel 14 may lead to the fact that the fuel channel 14 becomes bent during later operation.

The phenomenon shadow corrosion and its influence on the fuel channels 14 during the whole life of the fuel assembly 8 is thus very complicated and not completely understood.

U.S. Pat. No. 5,889,401 and WO 00/34768 A1 describe methods and apparatuses for eddy current measurements on components, for example fuel rods, in nuclear power reactors. As has been mentioned in these documents, it may be important to be able to carry out measurements of for example the thickness of layers which may exist on such components. The layer may for example be an oxide layer. A measurement may also be done concerning other properties than layer thickness, e.g. concerning the content of hydrides in the component. It is convenient to carry out the measurement with a measurement probe which is arranged in the immediate vicinity of the measurement object.

WO 2007/053100 A1 describes a system which is suitable for carrying out eddy current measurements on components, such as fuel rods for nuclear reactors, which are located under water.

SUMMARY OF THE INVENTION

An object of the invention is to provide a method which makes it possible to investigate how fuel channels of fuel assemblies for nuclear boiling water reactors have been influenced by shadow corrosion from neighbouring control rods during operation. A further object is that is shall be possible to carry out the investigation without the necessity to destroy the fuel channel. A further object is to investigate which properties different parts of the fuel channel have after that it has been used a certain time in a nuclear boiling water reactor, in order to thereby find out the risk for that the fuel channel will become bent during further use. A further object is to investigate fuel channels in order to better understand how the phenomenon shadow corrosion influences the fuel channels.

The above mentioned objects are achieved by a method of the kind which has been mentioned initially above and which comprises that:
the measurement is done by the use of a non-destructive inductive eddy current measurement method,
the measurement is done on a fuel channel which has been used at least a certain time during operation in the core of a nuclear boiling water reactor,
the measurement is carried out when the fuel channel is located in water,
the measurement is done on at least a first place on the fuel channel which is located at such a level of the fuel assembly, at which level during the operation in the nuclear reactor there is nuclear fuel in the fuel assembly, wherein said first place during at least a part of the operation time has been located in the direction towards a neighbouring control rod in the nuclear reactor so close to the control rod that the place in question is susceptible to having been the subject of shadow corrosion because of the control rod,
the measurement is done also on at least a second place on said fuel channel, wherein the second place is located such that it during the operation has not been located such that the place in question is susceptible to have been the subject of shadow corrosion because of said control rod,
wherein through the method at least the hydride content of the fuel channel at said first and second place is determined.

It has appeared that through such a method the objects described above are achieved. By using an inductive eddy current measurement method which is not destructive, the fuel assembly may after the measurement be used again in the core. This makes it possible to measure several times at different points in time on the same fuel channel. Thereby an increased understanding of how shadow corrosion influences the fuel channel during its whole life may be achieved. If some other measurement method than an inductive eddy current measurement method were to be used, it would otherwise usually be necessary to take a test sample out of the fuel channel for the analysis, which would mean that the fuel channel would be destroyed.

Since the measurement can be carried out when the fuel channel is located in water, the measurement can be carried out in the water pool to which the fuel assemblies may be transferred after having been in operation in the nuclear reactor. Furthermore, in this water pool the fuel assemblies are protected such that undesired radiation will not reach the environment.

Since the measurement is done on at least two different places as defined above, knowledge is achieved of how shadow corrosion has influenced the fuel channel. In particular, knowledge is thereby obtained of how shadow corrosion has influenced the absorption of hydrides in the fuel channel. An essentially increased understanding of the phenomenon shadow corrosion is therefore obtained by the method according to the invention.

Said non-destructive inductive eddy current measurement method is preferably of the kind where with the help of a coil at least one electromagnetic alternating field is generated which penetrates into the fuel channel in question and in the same generates eddy currents which retroact on the generated electromagnetic alternating field, wherein the measurement of the property in question is done by measuring a response to the generated electromagnetic alternating field and by carrying out a calculation of the property in question.

Preferably, the measurement is carried out in the water pool to which the fuel assembly has been transferred from the core of the nuclear reactor. From this water pool the fuel assembly may then, if it has not served its full time, be transferred back to the core in order to be used again in the nuclear reactor when it is in operation.

Said first place is thus preferably on a sidewall of the fuel channel. When it is said that the place in question has been located so close to the control rod that the place in question is susceptible to having been the subject of shadow corrosion because of the control rod, it is meant that the sidewall on the fuel channel where the place is located has during operation been placed nearest a control rod, without any further components between the place and the control rod blade. Shadow corrosion occurs when the distance between the components in question (in this case the fuel channel and the control rod blade) is short, and when the components are made of different materials of such a kind that shadow corrosion may occur.

When it is said that the second place is located such that it is not susceptible to have been the subject of shadow corrosion because of the control rod, it is meant that the place in question has not been facing a neighbouring control rod, in such a short distance from the control rod that shadow corrosion may occur.

According to one manner of carrying out the method according to the invention, said second place is located on a sidewall of the fuel channel which during the operation has not been facing the neighbouring control rod. By measuring both on a sidewall which has been the subject of shadow corrosion and a sidewall which has not been the subject of shadow corrosion, the differences between for example hydride content on these sides may be determined. Thereby information is obtained of for example the susceptibility of the fuel channel to bend during future use in the nuclear reactor.

Preferably, also the second place is located at such a level of the fuel assembly, at which level during the operation in the nuclear reactor there is nuclear fuel in the fuel assembly.

According to a further manner of carrying out the method according to the invention, measurement is done on at least a third place on another sidewall of the fuel channel than where the second place is located, wherein also the third place is located on a sidewall of the fuel channel which during operation has not been facing the neighbouring control rod.

Preferably, measurements are done on all four sidewalls of the fuel channel, wherein two sidewalls have been susceptible to have been the subject of shadow corrosion from the control rod, while the two other sides have not had this susceptibility. By measuring on three or preferably on all four sidewalls of the fuel channel further information is obtained of among other things the hydride content of different sidewalls of the fuel channel. Thereby further information is obtained of the susceptibility of the fuel channel to being bent.

Preferably, measurements are done on all four sidewalls of the fuel channel at such a level of the fuel assembly, at which level during the operation in the nuclear reactor there is nuclear fuel in the fuel assembly. Since the tendency to hydration is higher in the active part of the core, it is particularly important to measure at a level within the area for the active part of the core.

According to a further advantageous manner of carrying out the method according to the invention, said measurements are done from the outside of the fuel channel. This is advantageous since it easier to measure from the outside of the fuel channel and since the fuel channel is subject to shadow corrosion primarily from the outside.

According to a further advantageous manner of carrying out the method according to the invention, measurement is done also at at least one place from the inside of the fuel channel. Such a measurement is advantageous since information is thereby obtained of the difference in for example hydride content on the inside and outside of the fuel channel. This information makes it possible to better understand and predict the tendency of the fuel channel to bend.

Preferably, also this measurement is done on such a level of the fuel assembly, at which level during operation in the nuclear reactor there is nuclear fuel in the fuel assembly.

According to a further advantageous manner of carrying out the method according to the invention, measurement by the use of said non-destructive inductive eddy current measurement method is also done, during the same conditions and in the same pool of water as the previously mentioned measurements, on at least one standard sample which is made of essentially the same alloy as the fuel channel but which does not contain any essential amount of hydrides and which is provided with a layer of a first known thickness, which layer is made of a non-magnetic and not electrically conductive material, wherein the result from the measurement on such a standard sample is used, at the determination of the hydride content at the measurement on the fuel channel, in order to take into account the influence on the measurement of a possible oxide layer which may exist on the fuel channel.

The measurement of the hydride content in the fuel channel is very sensitive. An oxide layer which exists on the fuel channel has a substantially larger influence on the measurement result than the hydride content. It is therefore important to be able to calibrate for the influence of the oxide layer on the measurement result. This may be done by measuring on one, or preferably several, standard samples with a layer of known thickness. It can thereby be established how the measurement result depends on the layer thickness, i.e. a relationship between measurement result and layer thickness can be established. The hydride content which is to be determined at the measurement on the fuel channel is then obtained as a deviation from the relationship that was established through the measurements on the standard samples. Since the measurement method is also very sensitive to the measurement conditions, it is an important advantage that the measurements on the standard samples are carried out in the same environment and under the same conditions as the measurements on the actual fuel channel.

According to a further advantageous manner of carrying out the method according to the invention, measurement is done also on at least one other standard sample which is made of essentially the same alloy as the fuel channel but which does not contain any essential amount of hydrides and which either is not provided with said layer or which is provided with one of said layers of a second known thickness which is different from the first known thickness.

Preferably, measurement is done on such a standard sample without any layer of said kind and also measurement on at least two further standard samples with layers of said kind of different thickness. By measuring on a plurality of such standard samples, the calibration is improved, which means that the determination of the hydride content in the fuel channel is improved.

According to a further advantageous manner of carrying out the method according to the invention, measurement is also done at at least one place on the fuel channel which is located so high up or so far down at the fuel channel that the place is located at such a level of the fuel assembly, at which level during the operation in the nuclear reactor there is no nuclear fuel in the fuel assembly.

At such a place probably no (or only small amounts of) hydrides have been formed. This measurement can therefore be used as comparison with the measurements on places with a larger amount of hydrides in order to verify that it is actual the hydride content which has been determined during the measurements.

Preferably, the measurement is thereby done on some of the sidewalls (or on both the sidewalls) which have not been facing the control rod.

According to a further advantageous manner of carrying out the method according to the invention, measurement by the use of said non-destructive inductive eddy current measurement method is also done on at least one standard sample which is made of essentially the same alloy as the fuel channel and which contains a known content of hydrides, wherein the result from this measurement is used for calibrating the measurement at the determination of the hydride content at the measurement on the fuel channel. Through such a calibration measurement, the measurement accuracy is further improved. The measurement on such a standard sample constitutes a kind of check that the calibration which has been done based on the measurement on the above mentioned standard samples with layers of known thickness is actually accurate. If this is not the case, further calibration may be done with regard to the measurement on the standard sample (or standard samples) with a known hydride content.

This measurement may with advantage be done under the same conditions, and in the same pool of water as the measurements on the actual fuel channel. Alternatively, it is however possible to carry out the measurement in advance and to store the result in order to use it at the calibration with regard to the measurement on the actual fuel channel.

According to a further advantageous manner of carrying out the method according to the invention, the measurement by the use of said non-destructive inductive eddy current measurement method is done with the help of a coil which generates an electromagnetic alternating field which penetrates into the fuel channel in question, wherein the measurement is done at least two different frequencies of the generated alternating field. By measuring at a plurality of frequencies, the measurement result is improved.

Preferably, more than two different frequencies are used during the measurements, e.g. at least 8 different frequencies.

According to a further advantageous manner of carrying out the method according to the invention, measurement is done at least two different frequencies which both are higher than 500 KHz. The inductive coupling between the coil which generates the alternating field and the measurement object is improved if sufficiently high frequencies are used. Furthermore, a higher frequency means that the penetration depth of the generated electromagnetic alternating field is reduced. This is advantageous since it is thereby prevented that the wall thickness of the fuel channel influences the measurements.

Preferably, the frequencies are below the resonance frequency of the coil, for example below 20 MHz. According to an advantageous possibility, one of said at least two different frequencies is at least twice as high, preferably at least 5 times as high, as the second of said at least two different frequencies.

According to a further advantageous manner of carrying out the method according to the invention also the thickness of an oxide layer which is located on the fuel channel is determined through the measurements. An important advantage of the method according to the invention is that not only the hydride content may be determined but also the thickness of an oxide layer on the fuel channel. Thereby further information is obtained of the properties of the fuel channel.

According to a further advantageous manner of carrying out the method according to the invention it is the case that when said measurements have been carried out, the fuel assembly with the fuel channel is again placed in the core of the nuclear reactor, in order to be used during further operation of the nuclear reactor. Through the measurements, information is obtained of for example the susceptibility of the fuel channel to become bent during further use in the nuclear reactor. Since the method according to the present invention is non-destructive, the fuel assembly in question can after the measurements (if it has sufficiently good properties) be used again in the nuclear reactor.

According to a further advantageous manner of carrying out the method according to the invention, after said further operation of the nuclear reactor measurements are done again on the same fuel channel as previously, in order to determine at least how the hydride content has changed since the previous measurements. By measuring several times on the same fuel channel at different points in time, further improved information is obtained of the properties of the fuel channel and of how the phenomenon shadow corrosion influences the susceptibility of bow.

According to a further advantageous manner of carrying out the method according to the invention, said measurements with the non-destructive inductive eddy current measurement method are done on the fuel channel when the nuclear fuel has been taken out of the fuel channel.

The fuel channel is thereby not the subject of such a high temperature during the measurements, which means that a better measurement accuracy can be obtained, since the measurements are temperature sensitive. It should however be noted that alternatively it is possible to carry out the measurements when the fuel channel is filled with nuclear fuel. This manner has the advantage that it is not necessary to take out the nuclear fuel from the fuel channel when measurements are to be carried out.

DESCRIPTION OF AN EMBODIMENT OF THE INVENTION

Figure 3:
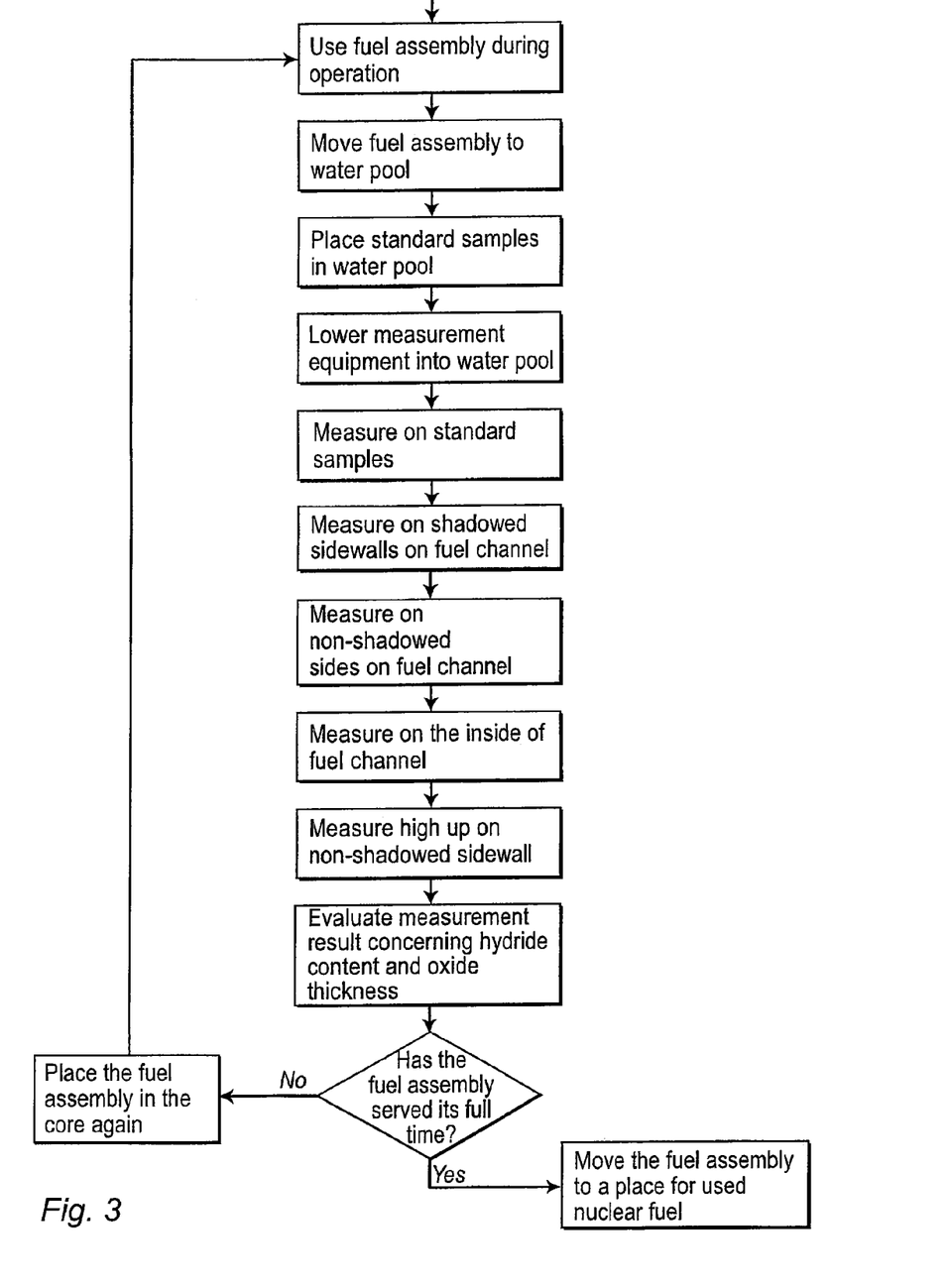
FIG. 3 shows schematically a flow-chart for a method according to the invention.

With reference to FIG. 3 an example of a method according to the invention will now be described.

The fuel assemblies 8 which are to be analysed are used during operation is the core of a nuclear boiling water reactor. After an operation cycle (for example after a year) the fuel assembly 8 or fuel assemblies 8 are moved to a water pool. In the water pool standard samples are placed. For example, four standard samples are used which are made of essentially the same alloy as the fuel channel 14 but which do not contain hydrides (or at least no essential amount of hydrides). Of these standard samples one has no applied layer while the three other standard samples have an applied layer of a known thickness which are different for the three samples. The layer is made of a non-magnetic and a not electrically conductive material, for example Mylar®.

For example two further standard samples do not have any applied layer but have a hydride content of a known amount (which is different for the two samples).

It is also possible to use standard samples which have a known hydride content and also a layer of said kind of known thickness.

The measurement equipment is lowered down into the water pool (possibly at the same time as the standard samples). Measurements are then carried out on the standard samples. The measurements both on the standard samples and on the fuel channel 14 can be carried out as described below.

The measurement is carried out by moving a measurement probe to the immediate vicinity of the measurement object (the standard sample or the fuel channel 14). The measurement probe suitably comprises at least one coil with the help of which an electromagnetic alternating field is generated. The electromagnetic alternating field penetrates into the measurement object. Eddy currents are thereby produced in the measurement object which retroact on the generated electromagnetic alternating field.

The used measurement system is configured to with the help of the measurement probe measure a response, caused by the eddy currents, on the generated electromagnetic alternating field. This response can be measured by measuring how the impedance of the coil is changed by the retroacting field from the eddy currents. The real and imaginary part of the impedance may thus be analysed for one or more frequencies of the alternating field in question. The system is thereby suitably configured to carry out a calculation of the property in question which is to be measured of the measurement object. The actual measurement procedure may for example be carried out in the manner which is described in the above cited documents U.S. Pat. No. 5,889,401 and WO 00/34768 A1. The actual calculation model may for example include an iterative process similar to the one which is described in these documents. The present invention is however not limited to the calculation process which is described in these documents. During the measurements, for example a system similar to the one which is described in the above mentioned WO 2007/053100 A1 can be used.

At each place where measurement is carried out, measurement is done at a plurality of frequencies, for example at 8 different frequencies. Preferably, all frequencies are higher than 500 KHz.

The measurements on the standard samples are used in order to, at the determination of the hydride content at the measurement on the fuel channel 14, be able to take in to account the influence on the measurement of in particular an oxide layer which exists on the fuel channel 14. This may be done by measuring on preferably several standard samples with a layer of a known thickness, which thickness is different for the different standard samples. At the measurement at different frequencies of the applied alternating field, it is obtained, through measurement on standard samples, a particular relationship of how for example the real and imaginary part of the measured impedance as a function of frequency depend on layer thickness. The hydride content which is to be determined at the measurement on the fuel channel is then obtained as a systematic deviation from the determined relationship based on the measurements on the standard samples.

Preferably, it is also measured on standard samples with known hydride content.

After that the measurement on standard samples has been carried out (or, alternatively, before such measurements) measurements are carried out on the fuel channel 14. It is thereby preferably measured on the outside of the sidewalls 1, 4 on both the sides of the fuel channel 14 which have been subject to shadow corrosion. Furthermore, it is preferably measured also from the outside on both the sidewalls 2, 3 of the fuel channel 14 which have not been subject to shadow corrosion.

Furthermore, a measurement may be done from the inside of the fuel channel 14 on different sidewalls. The measurements are preferably carried out at a level of the sidewalls which is at level where there is nuclear fuel in the fuel assembly 8 during operation. The nuclear fuel may however possibly be removed from the fuel assembly 8 before the measurements are carried out. In particular, if a measurement is carried out from the inside of the sidewalls, the nuclear fuel needs to be taken out of the fuel assembly 8 in order for it to be easier to be able to measure from the inside.

Furthermore, suitably measurement can be carried out high up or far down on a sidewall of the fuel channel 14, that is at a level on which there is no nuclear fuel in the fuel assembly 8 during operation. This measurement can be carried out on different sidewalls but preferably on a sidewall 2, 3 which is not subject of shadow corrosion.

Through the measurements, both hydride content and oxide thickness are determined at the different measurement places. Through these measurements, information is obtained which is important in order to understand how shadow corrosion can influence the bow of fuel channels 14. Through the measurement results also a prognosis may be made for the probability that the fuel channel 14 in question will become bent during further use in the core in the nuclear reactor.

It should be noted that fuel assemblies may contain channels in which non-boiling water flows when the fuel assembly is used during operation. There are for example a kind of fuel assembly with such channels which are designed such that they together form a cruciform arrangement. Except for carrying out measurements on the actual fuel channel, measurements may of course also be carried out on the walls of such water channels.

As has been mentioned above, the measurement on the fuel channel is preferably done in that the measurement probe is moved to the immediate vicinity of the fuel channel. The measurement probe thus preferably abuts against the fuel channel when measurement is carried out. It is however also possible to carry out measurements when the measurement probe is located at a short distance from the fuel channel (or other measurement object). For example, measurements can also be carried out when the measurement probe is located at a distance of 50 μm and 75 μm from the fuel channel. This may for example be carried out in that a foil of a known thickness (for example 50 μm and 75 μm, respectively, thick) is located between the measurement probe and the measurement object when the measurements are carried out. The measurement probe is thus in these cases held against the foil which lies between the measurement probe and the measurement object.

As has also been mentioned above, the measurements are temperature sensitive. The temperature should therefore be monitored during the measurement procedure. This may for example be done in the manners described in the above mentioned WO 2007/053100 A1.

If the fuel assembly 8 has served its full time, the fuel assembly 8 is moved to a place for used nuclear fuel. If however the fuel assembly 8 has not served its full time (for example if it has only been used during one operation cycle in the nuclear reactor), the fuel assembly 8 is again placed in the core in the nuclear boiling water reactor. The fuel assembly 8 in question can thereby be used during further operation.

After a further operation cycle the procedure which has been described above may then be carried out again. Through this non-destructive measurement method very detailed information may thereby be obtained of the properties of the fuel channel 14 at different stages of the use of the fuel assembly 8 during operation.

The invention is not limited to the above described example, but may be varied within the scope of the following claims.

The invention claimed is:

1. Method comprising measurement of at least one property of at least one fuel channel of fuel assemblies for nuclear boiling water reactors, which method comprises the steps of:
   (i) measuring a fuel channel of a fuel assembly which has been used at least a certain time during operation in a core of a nuclear boiling water reactor using a non-destructive inductive eddy current measurement method,
   wherein the measurement is carried out when the fuel channel is located in water,
   wherein said measuring step (i) is at least on a first place on the fuel channel which is located at a level of the fuel assembly, at which said level during operation in the nuclear boiling water reactor there is nuclear fuel in the fuel assembly, wherein said first place during at least a part of an operation time has been located in a direction towards a neighbouring control rod in the nuclear reactor close to the control rod such that the first place is susceptible to shadow corrosion by the control rod,
   (ii) measuring using said non-destructive inductive eddy current measurement method on at least a second place on said fuel channel, wherein the second place is located such that it during operation in the nuclear boiling water reactor has not been located such that the second place is susceptible to have been the subject of shadow corrosion because of said control rod,
   (iii) determining at least the hydride content of the fuel channel at said first and said second place based on the measurement steps (i)-(ii).

2. Method according to claim 1, wherein said second place is located on a sidewall of the fuel channel not facing the neighbouring control rod during operation in the nuclear boiling water reactor.

3. Method according to claim 2, further comprising the step of: (iia) measuring at least a third place on another sidewall of the fuel channel than where the second place is located, wherein the third place is located on a sidewall of the fuel channel not facing the neighbouring control rod during operation in the nuclear boiling water reactor.

4. Method according to claim 1, wherein said measuring steps (i)-(ii) are done from outside of the fuel channel.

5. Method according to claim 1, further comprising the step of: (iib) measuring at least one place inside of the fuel channel.

6. Method according to claim 1, further comprising the step of: (iic) measuring on at least one standard sample using said non-destructive inductive eddy current measurement method during the same conditions and in the same pool of water as said measuring steps (i)-(ii), wherein the at least one standard sample is made of essentially the same alloy as the fuel channel but does not contain any essential amount of hydrides and is provided with a layer of a first known thickness, said layer is made of a non-magnetic and non-electronically conductive material, wherein the result from measuring the at least one standard sample is used, at the determining step of the hydride content on the fuel channel, for accounting for an influence of an oxide layer on the fuel channel, during said measuring steps (i)-(ii) on the fuel channel.

7. Method according to claim 6, further comprising the step of: (iid) measuring on at least one other standard sample made of essentially the same alloy as the fuel channel but which does not contain any essential amount of hydrides and which either is not provided with said layer or which is provided with said layer of a second known thickness which is different from the first known thickness.

8. Method according to claim 1, further comprising the step of: (iie) measuring at least one place on the fuel channel which is located at a level relative to the fuel assembly at which said level there is no nuclear fuel in the fuel assembly during operation in the nuclear boiling water reactor.

9. Method according to claim 1, further comprising the step of: (iif) measuring using said non-destructive inductive eddy current measurement method on at least one standard sample made of essentially the same alloy as the fuel channel and containing a known content of hydrides for calibrating the determining step (iii) of the hydride content on the fuel channel.

10. Method according to claim 1, wherein said measuring steps (i)-(ii) using said non-destructive inductive eddy current measurement method is done by a coil generating an electromagnetic alternating field which penetrates into the fuel channel, wherein the generated alternating field is of at least two different frequencies.

11. Method according to claim 10, wherein the at least two different frequencies are both higher than 500 kHz.

12. Method according to claim 1, further comprising the step of: (iv) determining a thickness of an oxide layer on the fuel channel based on the measurement steps (i)-(ii).

13. Method according to claim 1, further comprising, after the measuring steps (i)-(ii), the step of: (v) placing the fuel assembly with the fuel channel in the core of the nuclear reactor, in order to be used during a further operation of the nuclear reactor.

14. Method according to claim 13, further comprising after the placing step (v) and after said further operation of the nuclear reactor, repeating said measuring steps (i)-(ii) on the same fuel channel and determining a change in at least the hydride content.

15. Method according to claim 1, wherein said measurement steps (i)-(ii) using the non-destructive inductive eddy current measurement method are done on the fuel channel when the nuclear fuel has been taken out of the fuel channel.

* * * * *

UNITED STATES PATENT AND TRADEMARK OFFICE
CERTIFICATE OF CORRECTION

PATENT NO.         : 8,699,654 B2
APPLICATION NO.    : 12/996947
DATED              : April 15, 2014
INVENTOR(S)        : Kurt-Ake Magnusson et al.

It is certified that error appears in the above-identified patent and that said Letters Patent is hereby corrected as shown below:

In the Claims

Column 11, Line 12, Claim 6: "non-electronically" should be changed to --non-electrically--.

Signed and Sealed this
Twenty-fourth Day of June, 2014

Michelle K. Lee
*Deputy Director of the United States Patent and Trademark Office*